US012229052B2

United States Patent
Srinivasan et al.

(10) Patent No.: US 12,229,052 B2
(45) Date of Patent: *Feb. 18, 2025

(54) SYSTEM FOR PREFETCHING DATA INTO A CACHE

(71) Applicant: QUALCOMM Incorporated, San Diego, CA (US)

(72) Inventors: Ramkumar Srinivasan, Bangalore (IN); Gerard Williams, Newport Coast, CA (US); Varun Palivela, Santa Clara, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/624,290

(22) Filed: Apr. 2, 2024

(65) Prior Publication Data

US 2024/0248847 A1 Jul. 25, 2024

Related U.S. Application Data

(63) Continuation of application No. 18/169,118, filed on Feb. 14, 2023, now Pat. No. 12,135,649.

(60) Provisional application No. 63/386,224, filed on Dec. 6, 2022.

(51) Int. Cl.
  *G06F 12/0862* (2016.01)
  *G06F 12/02* (2006.01)
  *G06F 12/123* (2016.01)

(52) U.S. Cl.
  CPC ...... *G06F 12/0862* (2013.01); *G06F 12/0238* (2013.01); *G06F 12/123* (2013.01)

(58) Field of Classification Search
  CPC . G06F 12/0238; G06F 12/0862; G06F 12/123
  USPC .......................................................... 711/118
  See application file for complete search history.

(56) References Cited

U.S. PATENT DOCUMENTS

| | | | |
|---|---|---|---|
| 10,642,618 B1* | 5/2020 | Hakewill | ............ G06F 9/30054 |
| 2015/0121014 A1 | 4/2015 | Dasika et al. | |
| 2019/0065375 A1 | 2/2019 | Al Sheikh et al. | |
| 2022/0350744 A1* | 11/2022 | Urrinkala | ............ G06F 12/0862 |

(Continued)

OTHER PUBLICATIONS

International Search Report and Written Opinion for International Patent Application No. PCT/US2023/081121, mailed Mar. 26, 2024, 11 pages.

*Primary Examiner* — Hashem Farrokh
(74) *Attorney, Agent, or Firm* — QUALCOMM Incorporated

(57) ABSTRACT

In one aspect, a delta prefetcher disclosed herein bases its predictions on both past memory accesses and predictively prefetched memory accesses. More specifically, the delta prefetcher disclosed herein bases its prediction on both the difference or "delta" between memory addresses of data previously fetched from memory and the difference or "delta" between addresses of data predictively fetched from memory. The delta prefetcher tracks the delta memory accesses by utilizing two distinctive tables. The fetch table tracks the memory deltas for each memory operation, such as a LOAD or STORE instruction, that the CPU has executed. The delta table predicts the next memory address to prefetch based on the last prefetched memory accesses.

20 Claims, 7 Drawing Sheets

(56) References Cited

U.S. PATENT DOCUMENTS

2023/0214325 A1* 7/2023 Shukla .................. G06F 9/3838
    711/122
2024/0184700 A1  6/2024 Srinivasan et al.

* cited by examiner

200

| ADDRESS OF MEMOP | MEMOP | DATA MEMORY ADDRESS |
|---|---|---|
| 900000 | LOAD | 85 |
| 100000 | LOAD | 100 |
| 110000 | LOAD | 110 |
| 120000 | LOAD | 115 |
|  |  |  |

206 — 900000 row
208 — 100000 row
210 — 110000 row
204 — 120000 row

| ADDRESS OF MEMOP | MEMOP | DATA MEMORY ADDRESS |
|---|---|---|
| 110000 | LOAD | 110 |
| 120000 | LOAD | 115 |
|  |  | 135 |
|  |  | 145 |

218 — 120000 row
220 — 135 row (222)
232 — 145 row (230)

SYSTEM FOR PREFETCHING DATA INTO A CACHE

PRIORITY APPLICATIONS

The present application is a continuation of and claims priority to U.S. patent application Ser. No. 18/169,118, filed Feb. 14, 2023 and entitled "SYSTEM FOR PREFETCHING DATA INTO A CACHE," which is incorporated herein by reference in its entirety.

U.S. patent application Ser. No. 18/169,118 claims priority to U.S. Provisional Patent Application Ser. No. 63/386,224, filed Dec. 6, 2022 and entitled "SYSTEM FOR PREFETCHING DATA INTO A CACHE," which is incorporated herein by reference in its entirety.

BACKGROUND

I. Field of the Disclosure

The technology of the disclosure relates generally to predictively fetching data into a cache in a processor-based system.

II. Background

The speed of central processing units (CPUs) has continued to increase over the years. However, latency in retrieving data from memory, such as dynamic random access memory (DRAM), which is external to a CPU, usually lags the pace of the speed of CPUs. As a result, CPUs will have to stall their processing of memory instructions (e.g., load instructions) until the data needed for the memory instructions is retrieved from external memory.

Data prefetchers are a central element in today's CPU microarchitectures and have to be efficient and highly successful in their prediction in order to increase the performance of the CPU. Data prefetching techniques allow a CPU to speculatively fetch data from external memory to its internal cache so that the data is available in the CPU's cache when needed by an executing program. Data prefetching is possible because predictable patterns exist in every executing program. In general, data prefetching techniques obviate CPU stalls only when data address predictions are successful. As a result, the more successfully a data prefetching technique can predict what data will be needed by the CPU, the fewer CPU stalls are achieved, and the overall CPU performance is increased.

A conventional data prefetcher may merely predict a constant stride pattern. For example, such a conventional data prefetcher may see that memory data has been accessed at memory locations 0x100000, 0x160000, and 0x200000 as a detected stride pattern of 0x60000 and then simply predict 0x2600000 as the next memory location of the detected stride to be accessed.

SUMMARY

Aspects disclosed in the detailed description include a prefetch system that bases its predictions of data memory addresses on both past memory accesses and predictively prefetched memory accesses. Related processor-based systems and methods are also disclosed. In exemplary aspects, the delta prefetcher is provided as part of a processor-based system. The processor-based system may include a central processing unit (CPU) and/or a dedicated processing unit, such as a graphic processing unit (GPU), as examples. In exemplary aspects, the prefetch system bases its prediction on both the difference or "delta" between memory addresses of data previously fetched from memory and the difference or "delta" between addresses of data predictively fetched or prefetched from memory. The prefetch system tracks the delta memory accesses by utilizing two distinctive tables—a fetch table and a delta table. The fetch table tracks the memory deltas for each memory operation, such as a load-based or store-based instructions, that the CPU has executed. The prefetch system predicts the next memory address to prefetch based on the last prefetched memory accesses. By tracking memory deltas, the prefetch system can track not only complex memory stride patterns including very-large strides but can also track any sequence of changes in memory addresses related to processed memory operation instructions. Additionally, in other examples, the prefetch system can track the likelihood of the next prediction to dynamically modify and improve its own predictive model, which improves the overall performance of the CPU.

Aspects disclosed in the detailed description include a prefetch system for prefetching data into a cache. The prefetch system comprises a prefetch control circuit configured to, in response to receiving a memory operation comprising a first address of the memory operation and a first data memory address, access a first fetch entry of a plurality of fetch entries in a fetch table based on the first address of the memory operation, access a first delta entry of a plurality of delta entries in a delta table based on the first address of the memory operation and a set of fetched memory deltas in the first fetch entry, determine whether a difference between the first data memory address and a last fetched address in the first fetch entry matches a next delta in the first delta entry, and adjust a confidence value in the first delta entry. The prefetch control circuit is further configured, in response to a signal, to select a second fetch entry in the fetch table, access a second delta entry in the delta table based on a second address for a second memory operation in the second fetch entry and a set of prefetched memory deltas in the second fetch entry, and determine a prefetch address for prefetching by adding a next memory delta in the second delta entry to a last prefetched address in the second fetch entry.

In an exemplary aspect, a method for prefetching data is included. The method comprises in response to receiving a memory operation comprising a first address of the memory operation and a first data memory address, accessing a first fetch entry of a plurality of fetch entries in a fetch table based on the first address of the memory operation, accessing a first delta entry of a plurality of delta entries in a delta table based on the first address of the memory operation and a set of fetched memory deltas in the first fetch entry, determining whether a difference between the first data memory address and a last fetched address in the first fetch entry matches a next delta in the first delta entry, adjusting a confidence field in the first delta entry, and in response to a signal, selecting a second fetch entry in the fetch table, accessing a second delta entry in the delta table based on a second address for a second memory operation in the second fetch entry and a set of prefetched memory deltas in the second fetch entry, and determining a prefetch address for prefetching by adding a next memory delta in the second delta entry to a last prefetched address in the second fetch entry.

In another exemplary aspect, a non-transitory computer-readable storage medium comprising instructions executable by a processor, which, when executed by the processor, causes the processor to prefetch data from external memory to cache memory, is included. The non-transitory computer-readable storage medium comprises a code for hashing an address of a memop to index into a fetch table to obtain a first fetch entry in response to receiving the address of the memop and a data memory address, a code for hashing the address of the memop and a set of fetched memory deltas of the first fetch entry to obtain a first delta entry from a delta table, a code for incrementing a confidence field in the first delta entry if a next memory delta in the first delta entry equals a difference between the data memory address and a last fetched address in the first fetch entry, a code for hashing the address of the memop and a set of prefetched memory deltas from a second fetch entry to obtain a second delta entry in response to receiving a signal to process the second fetch entry in the fetch table, a code for calculating a prefetch address by adding the next memory delta from the second delta entry to a last prefetched address of the second fetch entry if the confidence field in the second delta entry is non-zero, and a code for fetching data at the prefetch address.

BRIEF DESCRIPTION OF THE DRAWINGS

FIGS. 2A and 2B illustrate examples of both the training and predictive operations of the delta prefetcher in the processor-based system of FIG. 1;

DETAILED DESCRIPTION

Figure 1:
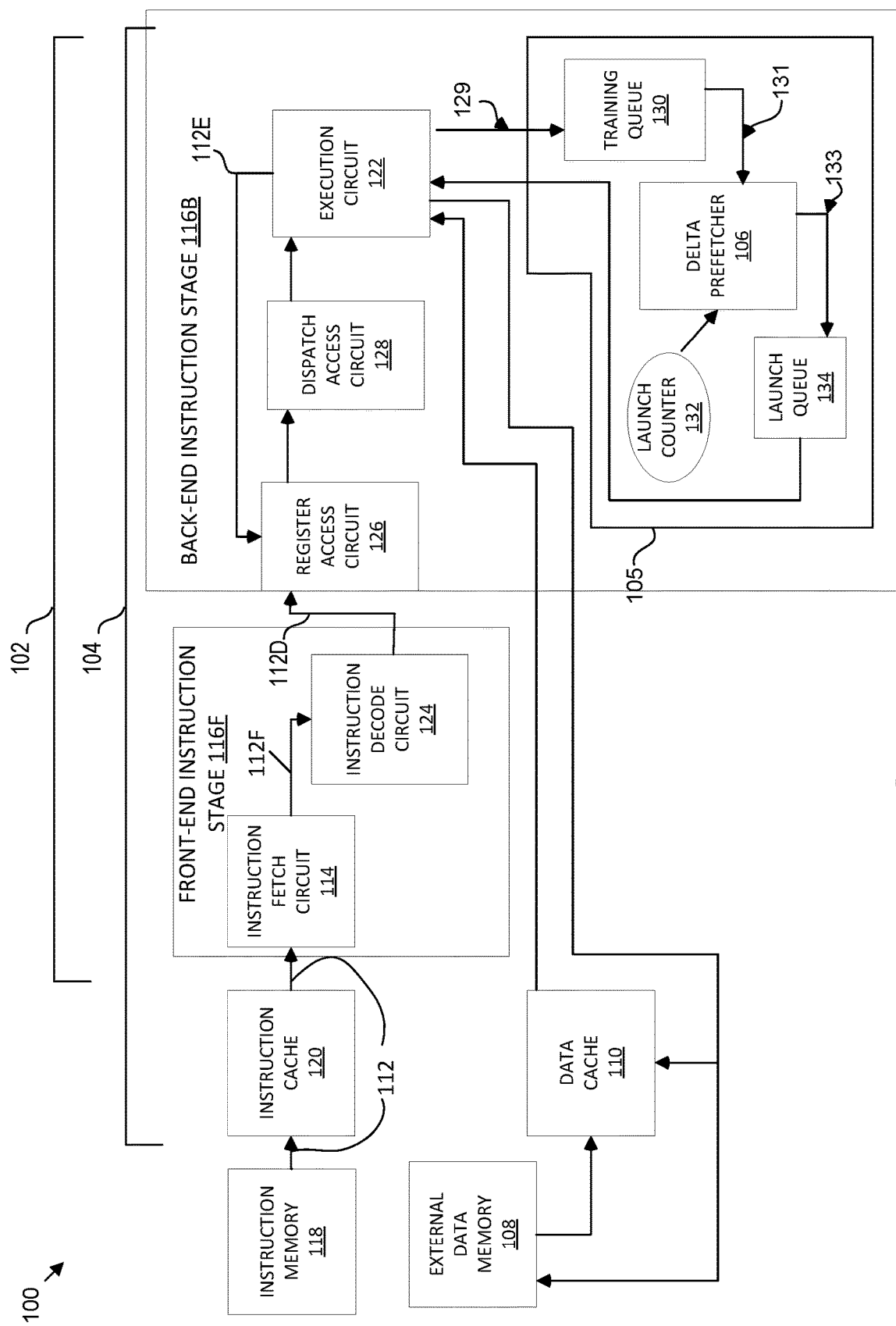
FIG. 1 is a block diagram of an exemplary processor-based system that includes an instruction processing circuit of a central processing unit (CPU) and a delta prefetcher configured to track fetched and prefetched memory deltas and predict the next memory delta to prefetch based on such tracked fetched and prefetched memory deltas.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include a prefetch system that predicts data memory addresses and bases its predictions on both past memory accesses and predictively prefetched memory accesses. Related processor-based systems and methods are also disclosed. In exemplary aspects, the delta prefetcher is provided as part of a processor-based system. The processor-based system may include a central processing unit (CPU) and/or a dedicated processing unit, such as a graphic processing unit (GPU), as examples. In exemplary aspects, the prefetch system bases its prediction on both the difference or "delta" between memory addresses of data previously fetched from memory and the difference or "delta" between addresses of data predictively fetched or prefetched from memory. For case of explanation, the detailed description describes the prefetch system which tracks the delta memory accesses by utilizing two tables—a fetch table and a delta table. The fetch table tracks the memory deltas for each memory operation, such as load-based or store-based instructions, that the CPU has executed. The prefetch system predicts the next memory address to prefetch based on the last prefetched memory accesses. By tracking memory deltas, the prefetch system can track not only varying memory stride patterns but can also track any sequence of changes in memory addresses related to processed memory operation instructions. Additionally, in other examples, the prefetch system can track the likelihood of the next prediction to dynamically modify and improve its own predictive model, which improves the overall performance of the CPU.

In this regard, FIG. 1 is a block diagram of an exemplary processor-based system 100 that includes an instruction processing system 102 of a central processing unit (CPU) 104 and a prefetch system 105 configured to track fetched and prefetched memory deltas and predict the next memory delta to prefetch based on such tracked fetched and prefetched memory deltas. The prefetch system 105 in this example also includes a delta prefetcher 106 to employ tracking of fetched and prefetched memory deltas and predicting the next memory delta to prefetch data from external data memory 108 into data cache 110. External data memory 108 is any memory outside of CPU 104 and can be any type of memory, including dynamic access memory (DRAM), and can be shared between multiple CPUs. External data memory 108 can also include being on the same or different integrated circuit as the CPU 104. Data cache 110 can be any level hierarchy of cache which is accessible to CPU 104.

Before discussing exemplary aspects of the prefetch system 105, other exemplary components of the processor-based system 100 are first described below.

In this regard, as an example, the CPU 104 may be provided in a system-on-a-chip (SoC). In this regard, instructions 112 are fetched by an instruction fetch circuit 114 provided in a front-end instruction stage 116F of the instruction processing system 102 from an instruction memory 118. For example, the instruction memory 118 may be provided in or as part of a system memory in the CPU 104. An instruction cache 120 may also be provided in the CPU 104 to cache the instructions 112 from the instruction memory 118 to reduce latency in the instruction fetch circuit 114 fetching the instructions 112. The instruction fetch circuit 114 is configured to provide the instructions 112 as fetched instructions 112F into one or more instruction pipelines in the instruction processing system 102 to be pre-processed before the fetched instructions 112F reaches an execution circuit 122 in a back-end instruction stage 116B in the instruction processing system 102 to be executed. The instruction pipelines are provided across different processing circuits or stages of the instruction processing system 102 to pre-process and process the fetched instructions 112F in a series of steps that are performed concurrently to increase throughput prior to execution of the fetched instructions 112F in the execution circuit 122.

With continuing reference to FIG. 1, the front-end instruction stage 116F of the instruction processing system 102 in this example also includes an instruction decode circuit 124.

The instruction decode circuit 124 is configured to decode the fetched instructions 112F fetched by the instruction fetch circuit 114 into decoded instructions 112D to determine the type of instructions 112 and actions required, which in turn is used to determine in which instruction pipeline the fetched instructions 112F should be placed. In this example, the decoded instructions 112D are then placed in one or more of the instruction pipelines and then provided to a register access circuit 126 in the back-end instruction stage 116B of the instruction processing system 102. The register access circuit 126 is configured to determine if any register names in the decoded instructions 112D need to be renamed to break any register dependencies that would prevent parallel or out-of-order processing of the instructions 112. The instruction processing system 102 in FIG. 1 is capable of processing the fetched instructions 112F out-of-order, if possible, to achieve greater throughput performance and parallelism. However, the number of logical (i.e., architectural) registers provided in the CPU 104 may be limited.

In this regard, the register access circuit 126 is provided in the back-end instruction stage 116B of the instruction processing system 102. The register access circuit 126 is configured to call upon a register map table (RMT) to rename a logical source register operand and/or write a destination register operand of an instruction 112 to available physical registers in a physical register file (PRF).

It may be desired to provide for the CPU 104 in FIG. 1 to have visibility to a large number of future instructions 112 (i.e., an instruction window) in order to extract a larger number of instructions 112 that can be executed independently, out-of-order for increased performance.

The register access circuit 126 is also configured to provide the retrieved produced value from the executed instruction 112E as the source register operand of an instruction 112 to be executed. Also, in the instruction processing system 102 in FIG. 1, the dispatch access circuit 128 is provided in the instruction pipeline after the register access circuit 126 in the back-end instruction stage 116B. The dispatch access circuit 128 is configured to dispatch the decoded instructions 112D to the execution circuit 122 to be executed when all source register operands for the decoded instructions 112D are available. The execution circuit 122 is provided in the back-end instruction stage 116B.

For memory operation instructions, such as load-based and store-based instructions, the execution circuit 122 fetches data from data cache 110 based on the address specified in memory operation and external data memory 108 if the data is not already in data cache 110. A load-based instruction instructs CPU 104 to load data into local data cache 110 or local registers. A store-based instruction instructs CPU 104 to store data to external data memory 108. The execution circuit 122 sends a memory operation 129 to prefetch system 105 and, in particular, an optional training queue 130, where it waits for processing by the delta prefetcher 106. Alternatively, the execution circuit 122 sends the memory operation 129 directly to delta prefetcher 106. The delta prefetcher 106 reads memory operations 131 off of the training queue 130 to track the memory operations that have been executed. In response, the delta prefetcher 106 updates its internal structures (as discussed in more detail below) to record the last memory delta that was addressed for this memory operation 129. The delta prefetcher 106 then updates a prediction model for the memory delta between the address of the data fetched for the executed memory operation 129 and the address of the data fetched for a previous memory operation.

In order to obviate stalls in the instruction processing system 102, caused by fetched instructions 112F waiting for data to be fetched from external data memory 108 into the instruction processing system 102, the launch counter 132 can periodically signal the delta prefetcher 106 to process a memory operation that is being tracked. When the delta prefetcher 106 is signaled by launch counter 132, the delta prefetcher 106 queries the prediction model associated with the internally tracked memory operation to retrieve a memory delta to add to the last memory address that was prefetched for the tracked memory operation. The delta prefetcher 106 puts that calculated address 133 on optional launch queue 134. Launch queue 134 sends the calculated address 133 to execution circuit 122 to fetch the data into data cache 110. Alternatively, the delta prefetcher 106 sends the calculated address 133 directly to execution circuit 122. Further details of the operation of delta prefetcher 106 will be discussed in connection with the description of FIG. 2. Details of the internals of delta prefetcher 106 will be discussed in connection with the description of FIGS. 3-4.

FIGS. 2A and 2B illustrate examples of both the training operation 200 and the predictive operation 202 of the delta prefetcher 106 in the processor-based system 100 of FIG. 1. FIG. 2A illustrates a time sequence of load-based instructions, also known as a demand stream, that has been processed by instruction processing system 102. For this example, presume the LOAD instruction at time t3 204 was taken off training queue 130 and is being processed by delta prefetcher 106. At that time, the delta prefetcher 106 has already processed LOAD instructions at time t0 206, time t1 208, and time t2 210, and the delta prefetcher 106 has internally stored memory delta 212 and memory delta 214. When processing the LOAD at time t3 204, the objective of delta prefetcher 106 is to tune a predictive model which includes a next memory delta to prefetch. Delta prefetcher 106 retrieves an entry in the predictive model based on memory delta 212 and memory delta 214. If the entry in the predictive model has a next memory delta that equals memory delta 216, the confidence for that entry is adjusted to increase the confidence of the entry in the predictive model. Otherwise, the confidence for that entry is adjusted to decrease the confidence. Details of how the memory deltas are stored and the predictive model will be discussed in more detail in connection with FIG. 3.

FIG. 2B illustrates an example of the delta prefetcher 106 deploying its predictive model to prefetch data from memory, such as external data memory 108 or data cache 110 in the processor-based system 100 in FIG. 1. In this example, time t1 218 is the last LOAD instruction processed by instruction processing system 102, and data beginning at memory address 115 was fetched. In this example, at time t2 220, delta prefetcher 106 has previously prefetched data beginning at address 222, and launch counter 132 has signaled delta prefetcher to process an entry in its tracked memory deltas to determine the next memory address to prefetch. Delta prefetcher 106 will retrieve an entry from its predictive model based on memory delta 224 and memory delta 226 and add the next memory delta 228 stored in that entry to address 222 to prefetch data at memory address 230. For terminology purposes, the data memory address in time t1 218 is the last fetched address, the data memory address at time t2 220 is a prefetched address and the data memory address at time t3 232 is the last prefetched address. The addresses in time t2 220 and time t3 232 constitute the prefetch stream.

Figure 3:
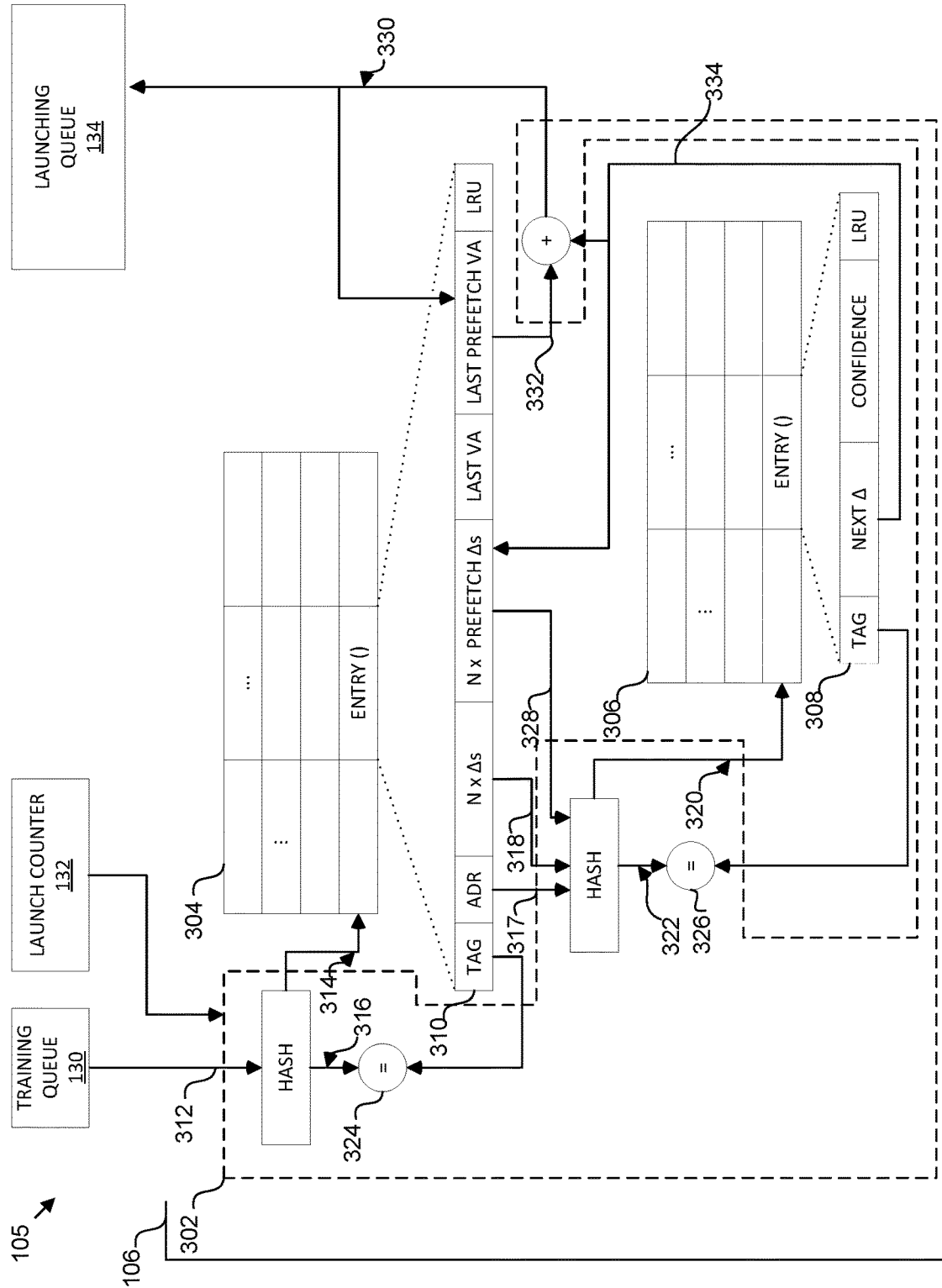
FIG. 3 is a block diagram of an exemplary prefetch system that can be included in the processor-based system in FIG. 1.

FIG. 3 is a block diagram of exemplary prefetch system 105, including delta prefetcher 106, which can be included in the processor-based system 100 in FIG. 1. Delta prefetcher 106 includes a prefetch control circuit 302, a fetch table 304 for tracking both fetched and prefetched memory deltas for a plurality of memory operations, and a delta table 306 for deploying the predictive model discussed above. The delta table 306 deploys the predictive model by maintaining a predictive memory delta given a set of memory deltas. A delta entry in the delta table includes a TAG, a next memory delta (next Δ) which is also known as a predictive memory delta, a confidence field, and optionally a least recently used (LRU) field. The confidence field is a counter that saturates positively or negatively, and its value indicates a level of accuracy for the next Δ prediction. Preferably, any positive value for the confidence field will be considered high for prediction purposes.

A fetch entry 310 of the fetch table 304 includes a TAG, an address of the memory operation being tracked or a hash of the same (ADR), a set of the last N number of memory deltas that have been fetched (NxΔs), a set of the last N number of memory deltas that have been prefetched (NxprefetchΔs), the last address that has been confirmed fetched (LAST VA), the last address that has been prefetched (LAST PREFETCH VA), and optionally an LRU field. The size of the set of the last N number of memory deltas that have been prefetched (NxΔs) and the size of the set of the last N number of memory deltas that have been prefetched (NxprefetchΔs) is preferably in a range of 2, 3 or 4 memory deltas. Also, NxΔs and NxprefetchΔs are sets managed as first-in, first-out queues such that their oldest entries are removed when a new entry is added.

Fetch table 304 and delta table 306 may be an M-way set associative table. An M-way set associative table means that the same index will reference M entries in the table. A TAG specifically addresses a specific entry in the M-way set. The size of M can vary based various design points. The fetch table 304 and delta table 306 may have different size ways. Preferable values for M are 4, 8, and 16 for both the fetch and delta tables.

The training operation discussed in FIG. 2A is deployed through the training path starting with optional training queue 130. Training queue 130 contains one or more memory operations that have been processed by the instruction processing system 102. In response to receiving a memory operation comprising a first address of the memory operation and a first data memory address over path 312, prefetch control circuit 302 accesses a first fetch entry of a plurality of fetch entries in the fetch table based on the first address of the memory operation (see blocks 406 and 408 of training path 402 in FIG. 4).

In particular, prefetch control circuit 302 hashes the first address of the memory operation, also known as the value of the program counter at the time the memory instruction was being processed by the instruction fetch circuit 114, to generate an index 314 and a tag 316. The index 314 specifies a row in fetch table 304, and the tag 316 specifies an entry in the row. Comparator 324 compares the generated tag 316 with a TAG field in one of the entries in the row returned by index 314 into fetch table 304. If they are equal, there is a hit and the prefetch control circuit 302 calculates a new memory delta by subtracting the LAST VA in the hit entry from the data address for the memory operation.

The prefetch control circuit 302 will then access a first delta entry 308 of a plurality of delta entries in the delta table based on the first address of the memory operation and a set of fetched memory deltas in the first fetch entry 310, determines whether a difference between the first data memory address and a last fetched address in the first fetch entry matches a next delta in the first delta entry and adjusts a confidence value in the first delta entry; (see blocks 410, 412, and 414 of training path 402 in FIG. 4).

In particular, the prefetch control circuit 302 hashes the ADR 317 of the hit entry with the NxΔs 318 from the hit entry in the fetch table 304 to generate an index 320 and a tag 322. Index 320 returns a row from the delta table 306 and, utilizing comparator 326, compares the generated tag 322 to the TAG field in the entries in the indexed row. If generated tag 322 hits one of the entries in the row, the new memory delta is compared with the next Δ field of the hit entry in delta table 306. If the new memory delta equals the next Δ field, prefetch control circuit 302 boosts the confidence field in the hit entry in delta table 306. Otherwise, prefetch control circuit 302 decrements the confidence field in the hit entry of delta table 306 and sets the following fields accordingly in the hit entry in the fetch table 304 because this logic path indicates that the demand stream associated with the memory operation is out of sync with the prefetch stream:

$$N \times prefetch\,\Delta s = N \times \Delta s;$$

$$\text{LAST } PREFETCH \text{ VA} = \text{LAST VA}$$

If there is a miss in delta table 306, a new entry is allocated in the delta table 306 for the new memory delta calculated above. To do so, prefetch control circuit 302 processes the optional LRU field and the CONFIDENCE field in exemplary delta entry 308 and selects the least recently used entry among the entries containing low confidence values from the set of entries in the row returned by index 320. Low confidence values may be manifested when confidence values are negative. High confidence values may be manifested when confidence values are positive. A too-low confidence value is, for example, when the confidence value is the largest negative value the confidence field may hold. The prefetch control circuit 302 replaces the selected entry and sets the TAG of the selected entry with generated tag 322, sets the next Δ field to the new memory delta, and initializes the confidence field. The prefetch control circuit 302 also updates the hit entry in fetch table 304 as follows:

$$N \times prefetch\,\Delta s = N \times \Delta s;$$

$$\text{LAST } PREFETCH \text{ VA} = \text{LAST VA}$$

Returning to comparator 324, if there are no hits, prefetch control circuit 302 allocates a new entry in fetch table 304 to track the memory operation received from training queue 130. Prefetch control circuit 302 processes the optional LRU field and the CONFIDENCE field in exemplary fetch entry 310 and selects a least recently used entry from one of the entries returned by index 314, and replaces the selected fetch entry by setting its following fields:

$$TAG = \text{generated tag 316}$$

$$ADR = \text{memory operation address}$$

$$\text{LAST VA} =$$

$$\text{LAST } PREFETCH \text{ VA} = \text{data address for memory operation;}$$

$$N \times \Delta s = N \times prefetch\Delta s = 0;$$

Figure 4:
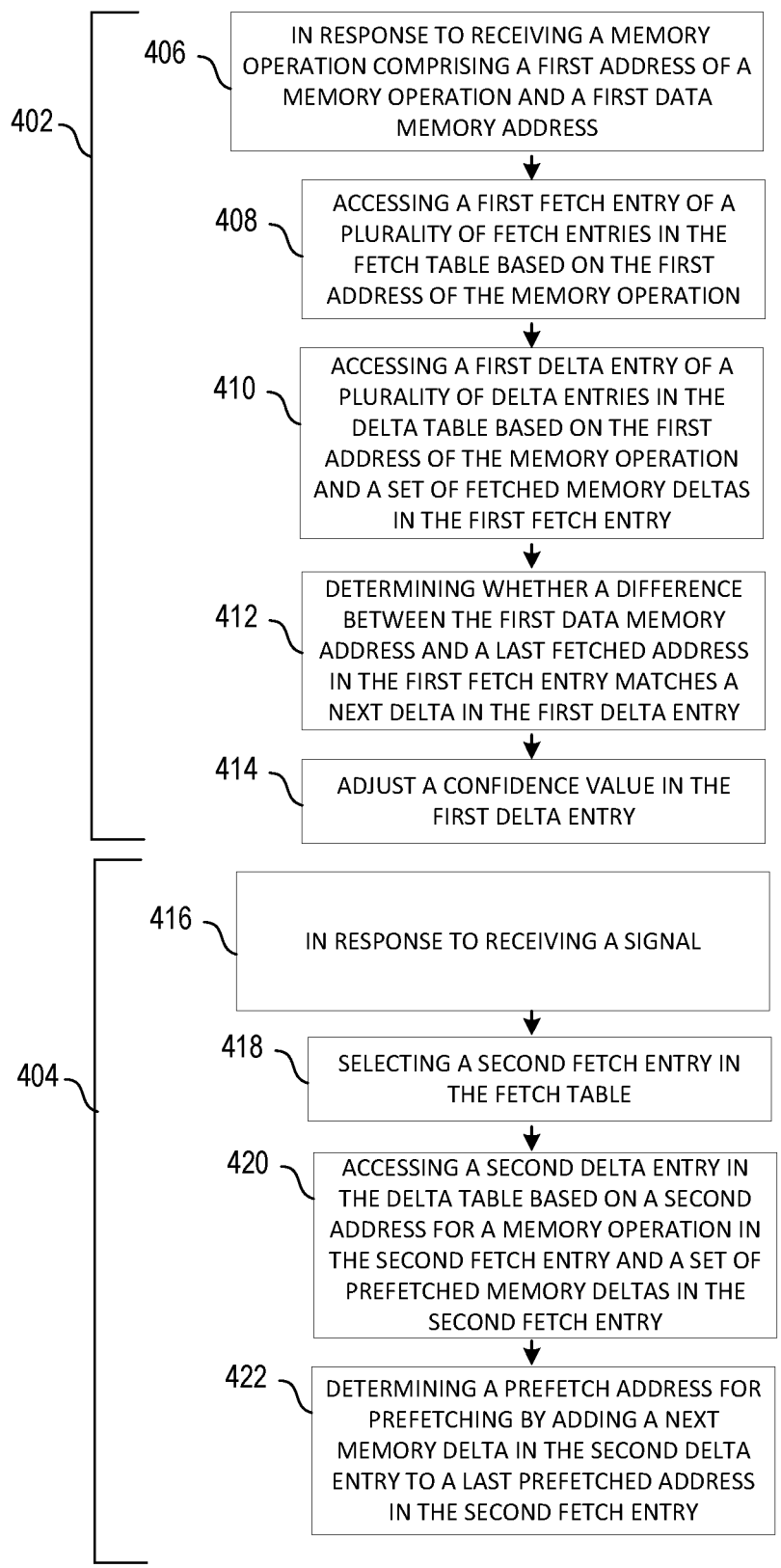
FIG. 4 is a flowchart illustrating an exemplary process for a training path and a prefetching path for a delta prefetcher described in connection with FIG. 3.

The prefetch operation discussed in FIG. 2B is deployed through the prefetch path, starting with receiving a signal to process a fetch entry in fetch table 304 (see prefetch path 404 in FIG. 4). In response to a signal to process a fetch entry in fetch table 304, the prefetch control circuit 302 selects the fetch entry in the fetch table 304, accesses a delta entry in the delta table 306 based on an address for a memory operation in the fetch entry and a set of prefetched memory deltas in the fetch entry, and determines a prefetch address for prefetching by adding a next memory delta in the delta entry to a last prefetched address in the second fetch entry. (see blocks 416, 418, 420, and 422 of FIG. 4)

In particular, launch counter 132 can be configured to signal prefetch control circuit 302 at any time period; and preferably, it signals prefetch control circuit 302 every clock cycle. When launch counter 132 signals prefetch control circuit 302, a next entry, say fetch entry 310, for example, in fetch table 304, is processed accordingly. Launch counter 132 sends periodic signals to prefetch control circuit 302, so it can walk all the entries in the fetch table 304 in a round-robin fashion. In response to a signal by launch counter 132, the prefetch control circuit hashes the ADR 317 and the NxprefetchΔs 328 of the next entry to generate index 320 into delta table 306 and tag 322. Index 320 returns a row from the delta table 306 and, utilizing comparator 326, compares the generated tag 322 to the TAG field in the entries in the indexed row. If generated tag 322 hits one of the entries, say exemplary delta entry 308, in the row of delta table 306, prefetch control circuit 302 calculates a prefetch address 330 by adding the LAST PREFETCH VA 332 from the next entry, fetch entry 310 in fetch table 304, to the next Δ 334 from delta entry 308.

If the prefetch address 330 is not the same as the LAST PREFETCH VA 332 in fetch entry 310, prefetch control circuit 302 generates a prefetch request with the calculated prefetch address and pushes it onto launch queue 134 if the confidence field of delta entry 308 is high. The launch queue will signal the execution circuit 122 to fetch data from external data memory 108. The prefetch control circuit 302 also updates the following fields in fetch entry 310 accordingly:

LAST *PREFETCH* VA = *prefetch* address

Pop the oldest NxprefetchΔs and push Next Δ to the NxprefetchΔs

All addresses discussed in connection with FIGS. 2A, 2B, and 3 above may be virtual or physical addresses. Preferably, all addresses referenced above are virtual addresses. For ease of explanation, fetch table 304 and delta table 306 are described as discrete tables. It is noted that fetch table 304 and delta table 306 can be deployed as one table aggregating fetch entries and delta entries. In such an aggregated table, fetch entry 310 and delta entry 308 can be read from and written to the aggregated table as described above.

Figure 5:
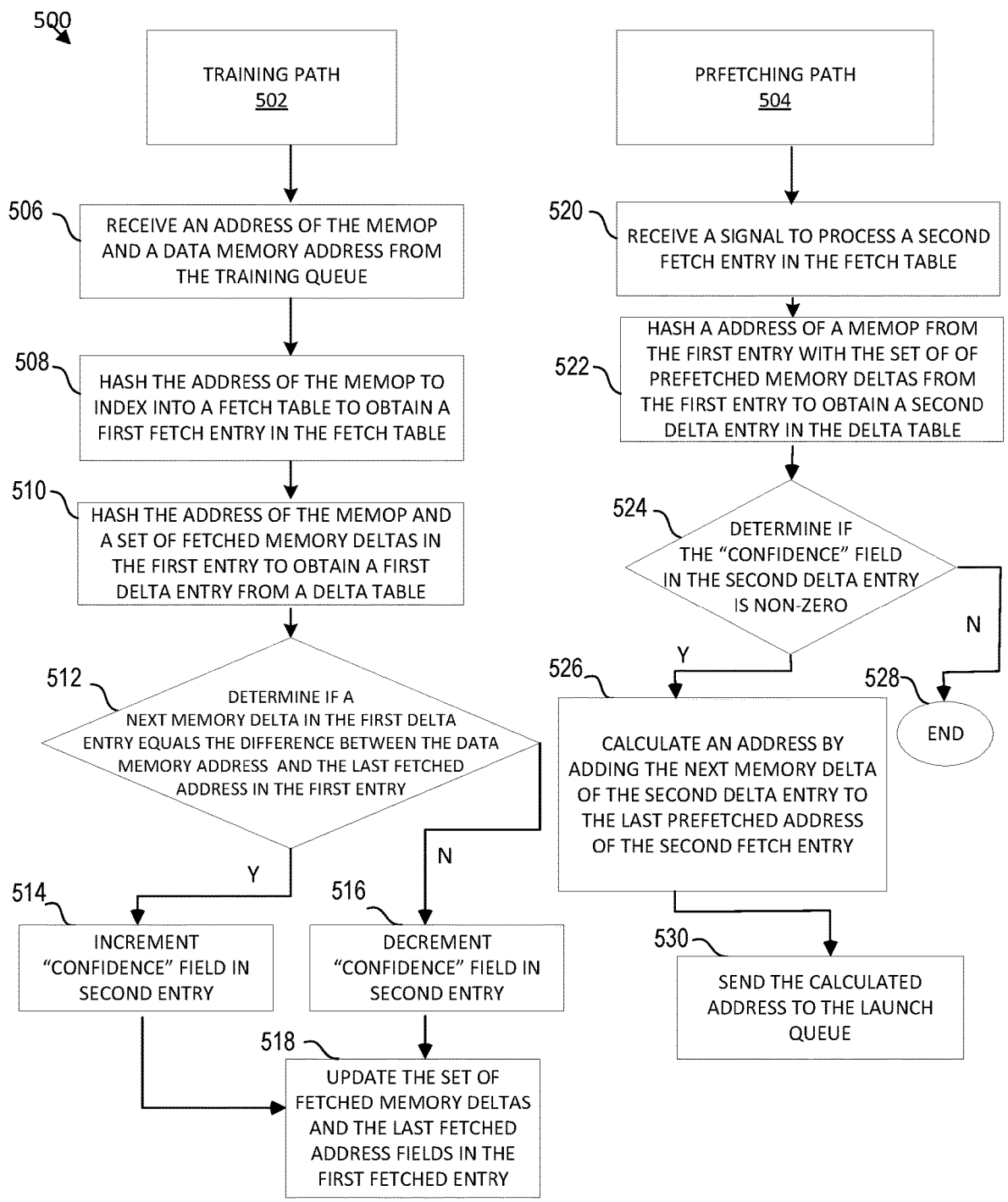
FIG. 5 is a flowchart illustrating further details of an exemplary process for a training path and a prefetching path for delta prefetcher described in connection with FIG. 3.

FIG. 5 is a flowchart illustrating another embodiment for a training path 502 for delta prefetcher 106 and a prefetching path 504 for delta prefetcher 106. The training path 502 begins at block 506. At block 506, process 500 receives an address of the memory operation (memop) and a data memory address from training queue 130. At block 508, process 500 hashes the address of the memop (ADR) to index into fetch table 304 to obtain a first fetch entry in the fetch table 304. At block 510, process 500 hashes the address of the memop and a set of fetched memory deltas (NxΔs) of the first fetch entry to obtain a first delta entry from delta table 306. At block 512, process 500 determines if the next memory delta (next Δ) of the first delta entry equals the difference between the data memory address and a last fetched address (LAST VA) in the first fetch entry. If process 500 determines that those fields are equal, it proceeds to block 514 and increments the "confidence" field in the first delta entry. If process 500 determines that those fields are not equal, it proceeds to block 516 and decrements the "confidence" field in the first delta entry. After block 514 and block 516, process 500 proceeds to block 518, which updates the set of fetched memory deltas (NxΔs) with the difference between the address of the memop and the last fetched address (LAST VA) field in the first fetch entry and removes the oldest memory delta from the set of fetched memory deltas (NxΔs). Also, at block 518, process 500 updates the last fetched address (LAST VA) field in the first fetch entry with the address of the memop.

The prefetching path 504 begins at block 520, where process 500 receives a signal to process a second fetch entry in the fetch table. At block 522, process 500 hashes the address of a memop (ADR") field of the second fetch entry with the set of prefetched memory deltas (NxprefetchΔs) to obtain a second delta entry in the delta table. At block 524, process 500 determines if the "confidence" field in the second delta entry is high or non-zero, for example. If it is not, process 500 proceeds to block 528 and ends for that received signal, or, in other words, no address is calculated to prefetch from memory. If it is, process 500 proceeds to block 526 and calculates an address by adding the next memory delta (next 4) field of the second delta entry to the last prefetched address (LAST PREFETCH VA) field in the second fetch entry. At block 530, process 500 sends the calculated entry to launch queue 134 to be prefetched by the execution circuit 122.

Figure 6:
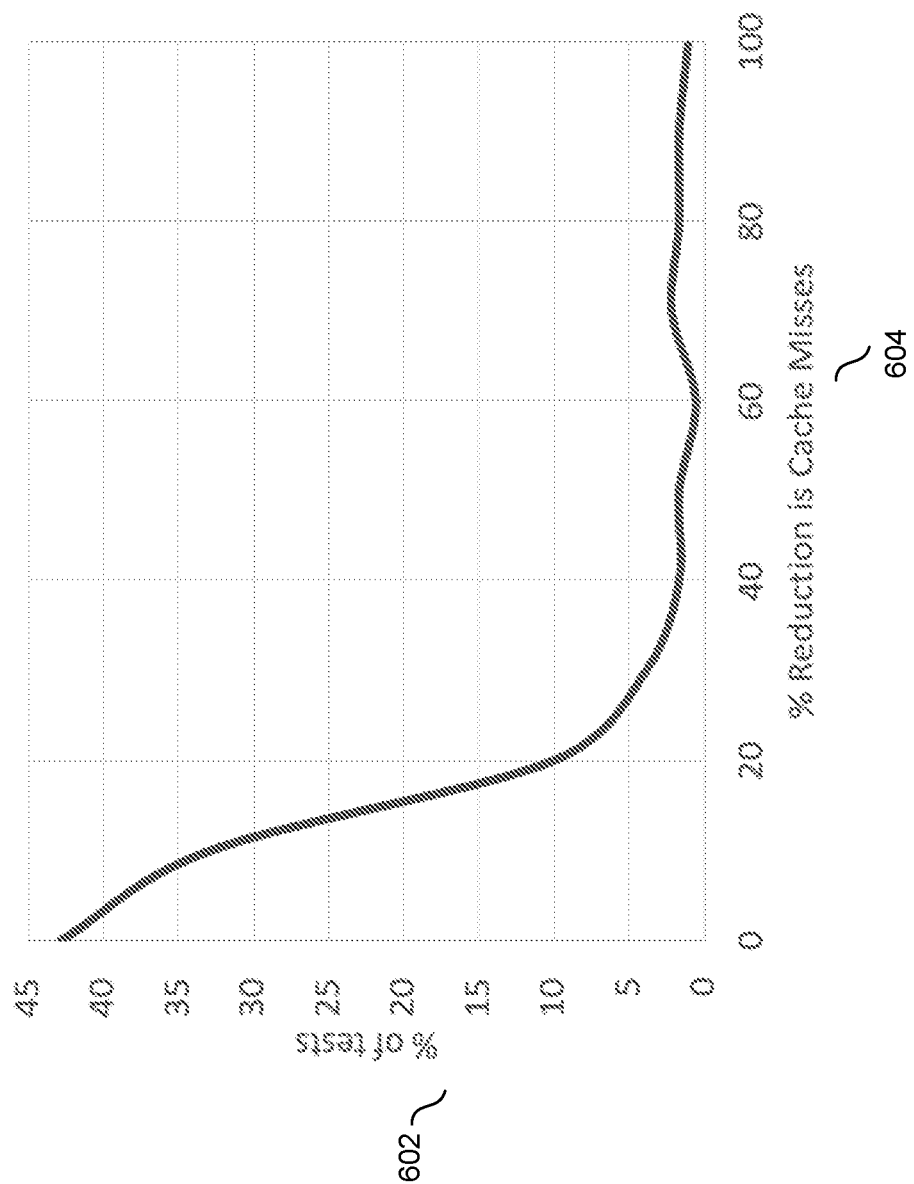
FIG. 6 is a graph showing exemplary simulated effectiveness of the delta prefetcher in FIG. 3.

FIG. 6 is a graph showing exemplary simulated effectiveness of the prefetch system 105 disclosed in connection with FIGS. 1 and 3. Hundreds of programs were run in a performance simulation model. These programs included known benchmarks such as SPEC_CPU_2006, SPEC_CPU_2017, and GIG_BENCH, for example, and specific internal tests such as opening up a browser, and system initialization, for example. The programs were run with and without the delta prefetcher 106. The graph illustrates a comparison of each of these tests run with and without delta prefetcher 106. Y-axis 602 shows the percentage of those tests, and the X-axis 604 shows the percentage of reduction of cache misses. From the graph, 43% of the tests showed no reduction of cache misses, 30% of the tests showed a 17% reduction in cache misses, 10% of the tests showed a 20% reduction in cache misses, and so on.

According to aspects disclosed herein, the delta prefetcher may be provided in or integrated into any processor-based device. Examples, without limitation, include a set-top box, an entertainment unit, a navigation device, a communications device, a fixed location data unit, a mobile location data unit, a global positioning system (GPS) device, a mobile phone, a cellular phone, a smartphone, a session initiation protocol (SIP) phone, a tablet, a phablet, a server, a computer, a portable computer, a mobile computing device, a wearable computing device (e.g., a smartwatch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 7:
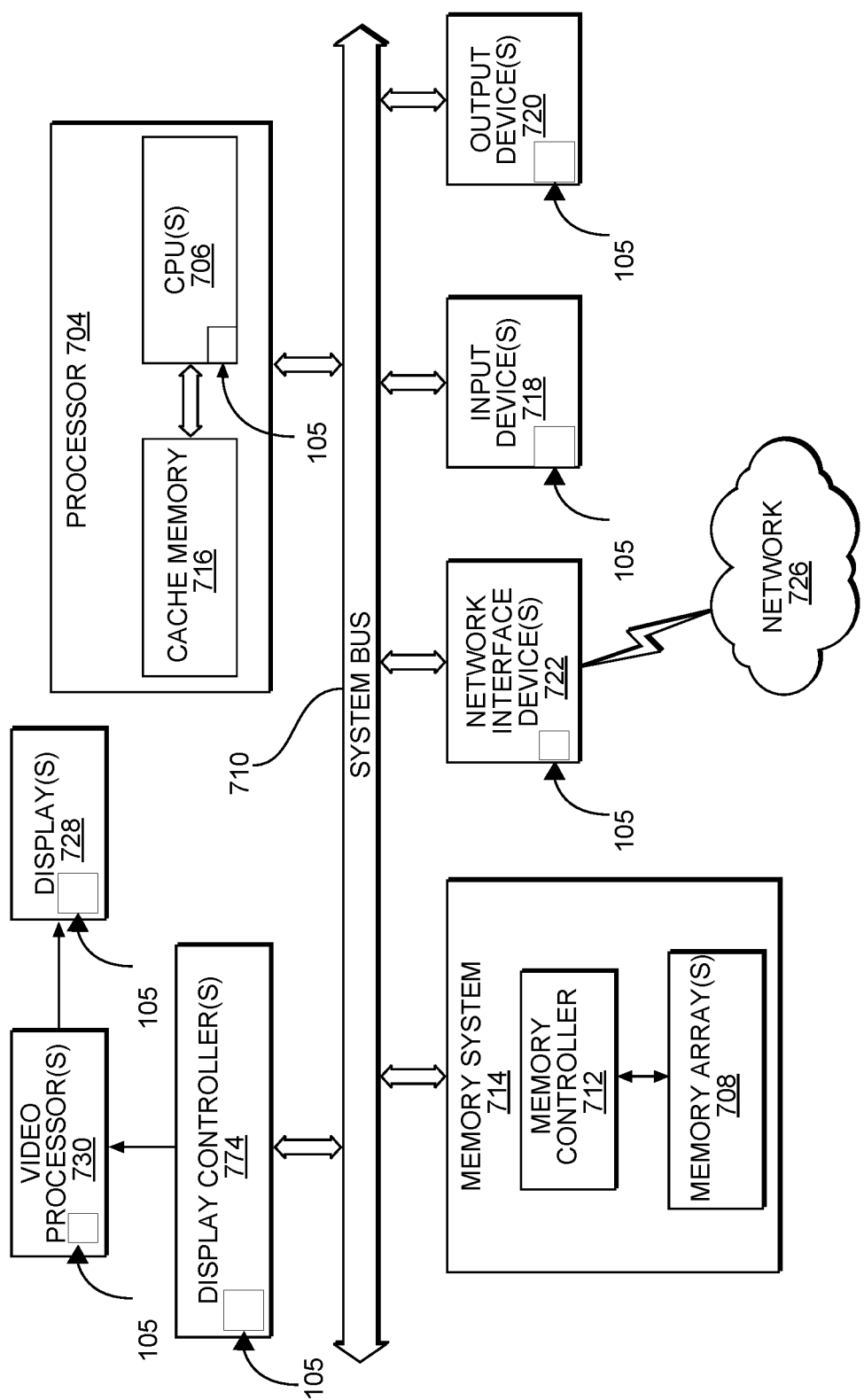
FIG. 7 is a block diagram of an exemplary processor-based system that can include a data prefetcher configured to track fetched and prefetched memory deltas and predict the next memory delta to prefetch based on such tracked fetched and prefetched memory deltas, including but not limited to the delta prefetcher in FIGS. 1 and 3.

In this regard, FIG. 7 illustrates an example of a processor-based system 100 that can employ prefetch system 105, illustrated in FIGS. 1 and 3. In this example, the processor-based system 100 includes one or more central processing units (CPUs) 706, each including one or more processors 704. The CPU(s) 706 may be a master device. The CPU(s) 706 may have cache memory 716 coupled to the processor(s) 704 for rapid access to temporarily stored data. Cache memory 716 may include computer-readable memory to store instructions executable by CPU(s) 706. When these instructions are executed by CPU(s) 706, they cause CPU(s) 706 to prefetch data from external memory system 714 to cache memory 716 utilizing prefetch system 105. Additionally, prefetch system 105 may be deployed in other caches including, but not limited to, a translation lookaside buffers (TLB) which a memory cache that stores the recent translations of virtual memory to physical memory. The CPU(s) 706 is coupled to a system bus 710 and can intercouple master and slave devices included in the processor-based system 100. As is well known, the CPU(s) 706 communicates with these other devices by exchanging address, control, and data information over the system bus 710. For example, the CPU(s) 706 can communicate bus transaction requests to a memory controller 712 as an example of a slave device. Although not illustrated in FIG. 6, multiple system buses 710 could be provided, wherein each system bus 710 constitutes a different fabric.

Other master and slave devices can be connected to the system bus 710. As illustrated in FIG. 7, these devices can include a memory system 714, one or more input devices 718, one or more output devices 720, one or more network interface devices 722, and one or more display controllers 724, as examples. The input device(s) 718 can include any type of input device, including, but not limited to, input keys, switches, voice processors, etc. The output device(s) 720 can include any type of output device, including, but not limited to, audio, video, other visual indicators, etc. The network interface device(s) 722 can be any device configured to allow an exchange of data to and from a network 726. The network 726 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 722 can be configured to support any type of communications protocol desired. The memory system 714 can include one or more memory arrays 708.

The CPU(s) 706 may also be configured to access the display controller(s) 724 over the system bus 710 to control information sent to one or more displays 728. The display controller(s) 724 sends information to the display(s) 728 to be displayed via one or more video processors 730, which process the information to be displayed into a format suitable for the display(s) 728. The display(s) 728 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium wherein any such instructions are executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from and write information to the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications, as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

Implementation examples are described in the following numbered clauses:

1. A prefetch system for prefetching data into a cache, comprising a prefetch control circuit configured to:
   in response to receiving a memory operation comprising a first address of the memory operation and a first data memory address:
      access a first fetch entry of a plurality of fetch entries in a fetch table based on the first address of the memory operation;
      access a first delta entry of a plurality of delta entries in a delta table based on the first address of the memory operation and a set of fetched memory deltas in the first fetch entry;
      determine whether a difference between the first data memory address and a last fetched address in the first fetch entry matches a next delta in the first delta entry;
   adjust a confidence value in the first delta entry; and
   the prefetch control circuit further configured, in response to a signal, to:
      select a second fetch entry in the fetch table;
      access a second delta entry in the delta table based on a second address for a second memory operation in the second fetch entry and a set of prefetched memory deltas in the second fetch entry; and
      determine a prefetch address for prefetching by adding a next memory delta in the second delta entry to a last prefetched address in the second fetch entry.

2. The apparatus of clause 1, wherein the prefetch control circuit adjusts the confidence value by incrementing the confidence value of the first delta entry if the difference between the first data memory address and a last fetched address in the first fetch matches the next delta in the first delta entry and by decrementing the confidence value if the difference does not match the next delta in the first delta entry.

3. The apparatus of clauses 1 or 2, wherein the memory operation is a load-based operation.

4. The apparatus of clauses 1-3, wherein the fetch table is an M-way set associative table and wherein the first fetch entry in the fetch table further includes an LRU field for managing replacement among M-fetch entries in a row of the fetch table.

5. The apparatus of clauses 1-4, wherein the delta table is an M-way set associative table and wherein the first delta entry in the delta table further includes an LRU field for managing replacement among M-delta entries in a row of the delta table.

6. The apparatus of clauses 1-5, wherein the fetch table contains X fetch entries and the prefetch control circuit is further configured to process X fetch entries in a plurality of X signals.

7. The apparatus of clauses 1-6, wherein the signal is received every clock cycle.

8. The apparatus of clauses 1-7, wherein the first address for the memory operation, the last fetched address, and the last prefetched address are virtual addresses.

9. The apparatus of clauses 1-8, further comprising a launch queue from which addresses are fetched from memory, wherein the prefetch control circuit is further configured to send the prefetch address for prefetching to the launch queue.

10. The apparatus of clauses 1-9, further comprising a training queue that sends the first address of the memory operation and the first data memory address to the prefetch control circuit.

11. The apparatus of clauses 1-10, wherein the size of the set of fetched memory deltas and the set of prefetched memory deltas is selected from a group consisting of 2, 3, and 4 memory deltas.

12. A method for prefetching data, comprising:
    in response to receiving a memory operation comprising a first address of the memory operation and a first data memory address:
       accessing a first fetch entry of a plurality of fetch entries in a fetch table based on the first address of the memory operation;
       accessing a first delta entry of a plurality of delta entries in a delta table based on the first address of the memory operation and a set of fetched memory deltas in the first fetch entry; and
       determining whether a difference between the first data memory address and a last fetched address in the first fetch entry matches a next delta in the first delta entry;
    adjusting a confidence field in the first delta entry; and
    in response to a signal:
       selecting a second fetch entry in the fetch table;
       accessing a second delta entry in the delta table based on a second address for a second memory operation in the second fetch entry and a set of prefetched memory deltas in the second fetch entry; and
       determining a prefetch address for prefetching by adding a next memory delta in the second delta entry to a last prefetched address in the second fetch entry.

13. The method of clause 12, wherein the adjusting the confidence field in the first delta entry further comprises:
    incrementing the confidence field in the first delta entry if the difference between the first data memory address and a last fetched address in the first fetch entry matches the next delta in the first delta entry; and
    decrementing the confidence field in the first delta entry if the difference does not match the next delta in the first delta entry.

14. The method of clauses 12-13, wherein the memory operation is a load-based instruction.

15. The method of clauses 12-14, wherein the first address of the memory operation, the second address of the memory operation, the last fetched address, and the last prefetched address are virtual addresses.

16. A non-transitory computer-readable storage medium comprising instructions executable by a processor, which, when executed by the processor, causes the processor to prefetch data from external memory to cache memory, comprising:
    in response to receiving a memory operation comprising a first address of the memory operation and a first data memory address:

code for accessing a first fetch entry of a plurality of fetch entries in a fetch table based on the first address of the memory operation;

code for accessing a first delta entry of a plurality of delta entries in a delta table based on the first address of the memory operation and a set of fetched memory deltas in the first fetch entry;

code for determining whether a difference between the first data memory address and a last fetched address in the first fetch entry matches a next delta in the first delta entry; and code for adjusting a confidence field in the first delta entry; and in response to a signal:

code for selecting a second fetch entry in the fetch table;

code for accessing a second delta entry in the delta table based on a second address for a second memory operation in the second fetch entry and a set of prefetched memory deltas in the second fetch entry; and code for determining a prefetch address for prefetching by adding a next memory delta in the second delta entry to a last prefetched address in the second fetch entry.

17. The non-transitory computer-readable storage medium of clause 16, further including:

code for decrementing the confidence field in the first delta entry if the next memory delta in the first delta entry does not equal the difference between the data memory address and the last fetched address in the first fetch entry.

18. The non-transitory computer-readable storage medium of clauses 16-17, wherein the memory operation is a load-based instruction.

19. The non-transitory computer-readable storage medium of clauses 16-18, wherein the address of the memory operation, the last fetched address of the first fetch entry, and the last prefetched address in the second fetch entry are virtual addresses.

20. A prefetch system for prefetching data into a cache, comprising a prefetch control circuit configured to:

in response to receiving a memory operation comprising a first address of the memory operation and a first data memory address:

access a first fetch entry of a plurality of fetch entries in a table based on the first address of the memory operation;

access a first delta entry of a plurality of delta entries in the table based on the first address of the memory operation and a set of fetched memory deltas in the first fetch entry;

determine whether a difference between the first data memory address and a last fetched address in the first fetch entry matches a next delta in the first delta entry;

adjust a confidence value in the first delta entry; and the prefetch control circuit further configured, in response to a signal, to:

select a second fetch entry in the table;

access a second delta entry in the table based on a second address for a second memory operation in the second fetch entry and a set of prefetched memory deltas in the second fetch entry; and determine a prefetch address for prefetching by adding a next memory delta in the second delta entry to a last prefetched address in the second fetch entry.

What is claimed is:

1. A prefetch system for prefetching data into a cache, comprising:

a prefetch control circuit;

a fetch table;

a delta table; and in response to a signal, the prefetch control circuit configured to:

select a first fetch entry in the fetch table, the first fetch entry comprising a first address for a first memory operation, a set of prefetched memory deltas, and a last prefetched address in the first fetch entry;

access a first delta entry in the delta table based on the first address for the first memory operation and the set of prefetched memory deltas, the first delta entry comprising a next memory delta;

determine a calculated address for prefetching by adding the next memory delta to the last prefetched address in the first fetch entry; and fetch data based on the calculated address.

2. The prefetch system of claim 1, wherein the prefetch control circuit is further configured to:

in response to receiving a second memory operation comprising a second address of the second memory operation and a second data memory address:

access a second fetch entry of a plurality of fetch entries in the fetch table based on the second address of the second memory operation;

access a second delta entry of a plurality of delta entries in the delta table based on the second address of the second memory operation and a set of fetched memory deltas in the second fetch entry;

determine whether a difference between the second data memory address and a last fetched address in the second fetch entry matches a next delta in the second delta entry; and adjust a confidence value in the second delta entry.

3. The prefetch system of claim 2, wherein the prefetch control circuit adjusts the confidence value by incrementing the confidence value of the second delta entry if the difference between the second data memory address and the last fetched address in the second fetch entry matches the next delta in the second delta entry and by decrementing the confidence value if the difference does not match the next delta in the second delta entry.

4. The prefetch system of claim 2, wherein the second memory operation is a load-based operation.

5. The prefetch system of claim 2, wherein the fetch table is an M-way set associative table and wherein the first fetch entry in the fetch table further includes a least recently used field for managing replacement among M-fetch entries in a row of the fetch table.

6. The prefetch system of claim 2, wherein the delta table is an M-way set associative table and wherein the first delta entry in the delta table further includes a least recently used field for managing replacement among M-delta entries in a row of the delta table.

7. The prefetch system of claim 1, wherein the signal is received every clock cycle.

8. The prefetch system of claim 2, wherein the first address for the first memory operation, the last fetched address in the second fetch entry, and the last prefetched address in the first fetch entry are virtual addresses.

9. The prefetch system of claim 1, further comprising a launch queue from which addresses are fetched from memory, wherein the prefetch control circuit is further configured to send the calculated address for prefetching to the launch queue.

10. The prefetch system of claim 2, further comprising a training queue that sends the second address of the second memory operation and the second data memory address to the prefetch control circuit.

11. The prefetch system of claim 2, wherein a size of the set of fetched memory deltas and the set of prefetched memory deltas is selected from a group consisting of 2, 3, and 4 memory deltas.

12. A method for prefetching data, comprising:
in response to a signal:
selecting a first fetch entry in a fetch table;
accessing a first delta entry in a delta table based on a first address for a first memory operation in the first fetch entry and a set of prefetched memory deltas in the first fetch entry; and
determining a prefetch address for prefetching by adding a next memory delta in the first delta entry to a last prefetched address in the first fetch entry.

13. The method of claim 12, further comprising:
in response to receiving a second memory operation comprising a second address of the second memory operation and a second data memory address:
accessing a second fetch entry of a plurality of fetch entries in the fetch table based on the second address of the second memory operation;
accessing a second delta entry of a plurality of delta entries in the delta table based on the second address of the second memory operation and a set of fetched memory deltas in the second fetch entry;
determining whether a difference between the second data memory address and a last fetched address in the second fetch entry matches a next delta in the second delta entry; and
adjusting a confidence field in the second delta entry.

14. The method of claim 13, wherein the adjusting the confidence field in the second delta entry further comprises:
incrementing the confidence field in the second delta entry if the difference between the second data memory address and the last fetched address in the second fetch entry matches the next delta in the second delta entry; and
decrementing the confidence field in the second delta entry if the difference does not match the next delta in the second delta entry.

15. The method of claim 14, wherein the second memory operation is a load-based instruction.

16. The method of claim 13, wherein the second address of the second memory operation, the first address of the first memory operation, the last fetched address in the second fetch entry, and the last prefetched address in the first fetch entry are virtual addresses.

17. A non-transitory computer-readable storage medium comprising instructions executable by a processor, which, when executed by the processor, cause the processor to prefetch data from external memory to cache memory, comprising:
in response to a signal:
selecting a first fetch entry in a fetch table;
accessing a first delta entry in a delta table based on a first address for a first memory operation in the first fetch entry and a set of prefetched memory deltas in the first fetch entry; and
determining a prefetch address for prefetching by adding a next memory delta in the first delta entry to a last prefetched address in the first fetch entry.

18. The non-transitory computer-readable storage medium of claim 17, further comprising:
in response to receiving a second memory operation comprising a second address of the second memory operation and a second data memory address:
accessing a second fetch entry of a plurality of fetch entries in the fetch table based on the second address of the second memory operation;
accessing a second delta entry of a plurality of delta entries in the delta table based on the second address of the second memory operation and a set of fetched memory deltas in the second fetch entry;
determining whether a difference between the second data memory address and a last fetched address in the second fetch entry matches a next delta in the second delta entry; and
adjusting a confidence field in the second delta entry.

19. The non-transitory computer-readable storage medium of claim 18, further including:
decrementing the confidence field in the second delta entry if the next memory delta in the first delta entry does not equal the difference between the second data memory address and the last fetched address in the first fetch entry.

20. The non-transitory computer-readable storage medium of claim 18, wherein the second memory operation is a load-based instruction.

* * * * *